United States Patent [19]
Kim et al.

[11] Patent Number: 5,486,726
[45] Date of Patent: Jan. 23, 1996

[54] POWER-SUPPLY CONTROL SYSTEM OF PERIPHERAL EQUIPMENT OF COMPUTER

[75] Inventors: Heejo Kim, Seoul; Jongyong Leem, Kyungki; Bongrak Choi, Seoul; Kyungsang Lee; Kyungseol Min, both of Kyungki, all of Rep. of Korea

[73] Assignee: Samsung Electronics Co., Ltd., Kyungki, Rep. of Korea

[21] Appl. No.: 104,202

[22] Filed: Aug. 11, 1993

[30]  Foreign Application Priority Data

Aug. 13, 1992 [KR] Rep. of Korea ............... 92-14590
Aug. 13, 1992 [KR] Rep. of Korea ............... 92-15238
Mar. 4, 1993 [KR] Rep. of Korea ............... 93-3116

[51] Int. Cl.⁶ ............................................. H01H 35/00
[52] U.S. Cl. ........................ 307/120; 364/273; 364/492; 395/750
[58] Field of Search ........................ 371/66; 360/69; 395/750, 800; 364/200, 707, 492; 307/252, 638, 120; 327/427

[56]  References Cited

U.S. PATENT DOCUMENTS

| | | | |
|---|---|---|---|
| 4,107,551 | 8/1978 | Akamatsu | 307/252 |
| 4,747,041 | 5/1988 | Engel et al. | 364/200 |
| 5,239,652 | 8/1993 | Seibert et al. | 395/750 |

*Primary Examiner*—William M. Shoop, Jr.
*Assistant Examiner*—Albert Paladini

[57]  ABSTRACT

The present invention discloses a power supply control system for the peripheral equipment of a computer which generates a signal for automatically cutting off the input power supplied to the peripheral equipment after a user has stop working on a computer for a predetermined period of time. Power to the peripheral equipment is then resumed when data is input to the computer system through an input. This system includes a first switching mechanism, an input-output sensing programmable array logic unit (PAL), internal-operation sensing programmable array logic unit, second switching mechanism, a counter and a controlling programmable array logic unit.

5 Claims, 3 Drawing Sheets

POWER-SUPPLY CONTROL SYSTEM OF PERIPHERAL EQUIPMENT OF COMPUTER

BACKGROUND OF THE INVENTION (1) Field of the Invention

The present invention relates to a power-supply control system for peripheral equipment of a computer. More particularly, it relates to a power-supply control system which automatically cuts off the alternating current (AC) input power to the peripheral equipment when a user who has worked on a computer stops working on the computer for a predetermined period of time. It again supplies the AC input power to the peripheral equipment when the user resumes his work on the computer.

(2) Description of the Prior Art

Due to the wide spread use of personal computers, the demand for peripheral equipment, such as monitors and printers, has increased. In fact, many view this equipment as indispensable and essential for the proper use of personal computers.

In conventional systems, power is continuously applied to the peripheral equipment even after a user stops working on the computer. Thus, if a user does not intend to use his peripheral equipment for a period of time, he must remember to turn off the power switches to that peripheral equipment, otherwise electrical power is wasted through the continuous AC input power supplied to this equipment.

In order to solve this problem, the Korean Utility Model Publication No. 91-3424 (filed on Dec. 31, 1987) entitled "Power-Supply Control Circuit of Television" discloses a technique for preventing this waste of power. This technique involves automatically turning off the power of a monitor, when no video signals are detected at its input. Such a technique is also disclosed in both Korean Utility Model Publication No. 91-3423 (filed on Dec. 31, 1987) which is entitled "Power-Automatically Turn-Off Circuit of Monitor", and Korean Utility Model Publication No. 90-8961 (filed on Nov. 29, 1985) which is entitled "Power-Automatically Cut-Off Circuit of Monitor".

In the above-mentioned "Power-Supply Control Circuit of Television" publication, control of a switching transistor in a switched mode power supply (SMPS) may be attained through the existence of video signals which are supplied to a video input stage of the monitor. Thus, the power of a television is automatically turned on or turned off corresponding to the existence of this signal. Similarly, the monitor of the "Power-Automatically Turn-Off Circuit of Monitor" publications automatically turned off when no video signal is present from the connected computer. Also, the "Power-Automatically Cut-Off Circuit of Monitor" disclosure automatically cuts off the power supplied to the monitor when the no keyboard input exists for a predetermined period of time during system use, where power to the monitor is resumed when input to the keyboard detected.

However, contrary to a television, a computer monitor has a continuously input video signal which exists regardless of its data flow. Since the conventional power-supply control circuit of a television cuts off power to its monitor on the basis of the existence of a video input signal, this circuit is not effective for computers or computer monitors which always have an input signal. In addition, this circuit may not be applied to a monitor which does not use a SMPS.

Similarly, the "Power-Automatically Turn-Off Circuit of Monitor" publication described above is not effective for computer monitors because it is based on the existence of the monitor input signal. Further, this circuit can only be applied to a device in which transmitting data is performed in series, such as a monitor. It cannot be applied to a device in which transmitting data is performed in parallel, such as a printer.

Finally, the "Power-Automatically Cut-Off Circuit of Monitor" publication concerns a circuit for sensing when data has not been input from the keyboard for a predetermined period of time. Because this circuit relies wholly on the input from one device, namely the keyboard, it neglects all other input and output devices such as a mouse, a series communication port or a parallel communication port. Thus, in the middle of an input/output operation through means of another input/output device, this system cuts off power to the monitor which may result in operator error.

SUMMARY OF THE INVENTION

It is an object of the present invention to provide a power supply control system for the peripheral equipment of a computer that generates a signal for automatically cutting off the alternating current (AC) input power applied to the peripheral equipment. That is, even if a user does not physically cut off the AC input power when he has stop working on a computer, this system will cut it off after he has stopped working for a predetermined period of time. Power to the peripheral equipment is then resumed when data is input to the computer system through an input means when the user resumes his work.

It is another object of the present invention to provide a power-supply control system for the peripheral equipment of a computer in which no noise is generated when the AC input power is electrically applied or cut off by means of gate turnoff thyristors (GTOs). Further, this object provides that no mechanical abrasion occurs due to the application or removal of the AC input power without mechanical contact.

In order to achieve these objects, this invention provides a power-supply control system for the peripheral equipment of a computer which includes a first switching mechanism which is user adjustable for generating a serial port sensing signal and an address selecting signal, and an input-output sensing programmable array logic (PAL) unit for both sensing input and output on an input-output mechanism due to a serial port sensing enable signal. It also includes an address selecting signal, an address signal and an address enable signal and for outputting a signal for sensing the use of an input-output means, and an internal-operation sensing programmable array logic (PAL) unit for sensing the internal state and operation of a computer from the chip selecting signals produced by the input-output sensing PAL. Also, it includes a second switching mechanism for enabling the user to adjust a delay-time signal, and a counter for outputting a current counting value while continuing a counting operation, where the counter is cleared in response to a counter clear signal. It also has a controlling programmable array logic (PAL) unit for outputting a power controlling signal to an external input-output mechanism which is based on the use of the input-output mechanism of the input-output sensing mechanism, the delay-time signal of the internal-operating sensing mechanism, the hardware disable signal, a reset signal of a system bus, a signal for reading the input and output mechanism, and the counting value of said counter.

As another aspect of the present invention, there is provided with a power-supply control system for the peripheral equipment of a computer which includes a system for both determining when a user does not input data to a computer by means of input means and when the user resumes his work on the computer, and for outputting a power controlling signal to a data signal line. This aspect also provides a power controller for controlling the AC power supply to the peripheral equipment in response to a power controlling signal which was input from the system on the data signal line.

As still another aspect of the present invention, there is provided a power-supply control system for the peripheral equipment of a computer which includes a system for both determining when a user does not input data to a computer by means of an input mechanism and when the user resumes his work on the computer, and for outputting a power controlling signal to a data signal line. This aspect of the present invention also includes a power cut-off mechanism for the peripheral equipment which operates without noise or mechanical abrasion by applying or cutting off the AC power supplied to the peripheral equipment through gate turn-off thyristors (GTOs), where the GTOs act in response to a power controlling signal which is input from the system.

DESCRIPTION OF THE PREFERRED EMBODIMENTS

Figure 1:
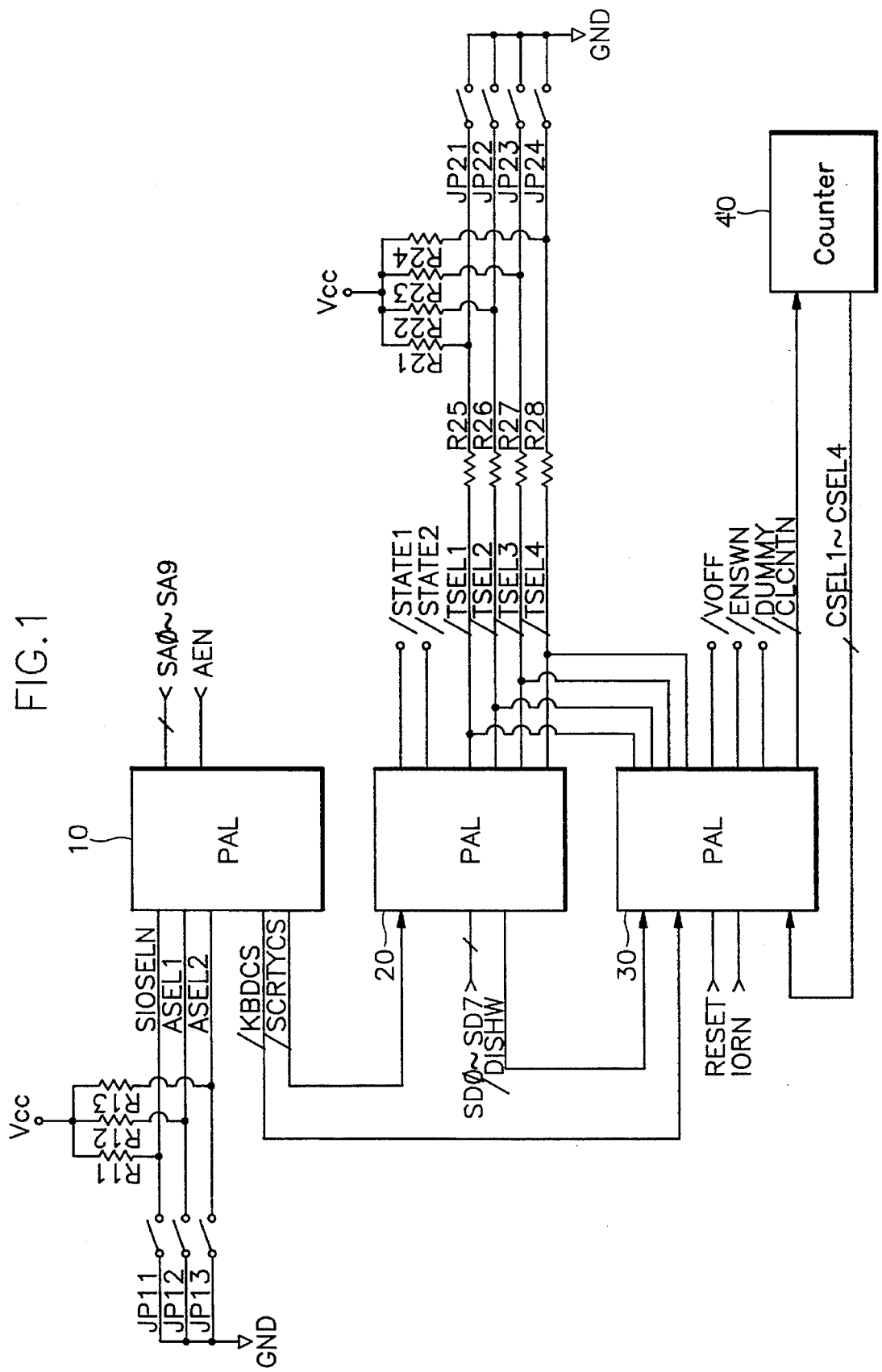
FIG. 1 is a detailed circuit diagram of a power-supply control system of the peripheral equipment of a computer in accordance with a first preferred embodiment of the present invention.

FIG. 1 is a detailed circuit diagram of a power-supply control system for the peripheral equipment of a computer in accordance with a first preferred embodiment of the present invention.

As shown in FIG. 1, the power-supply control system includes full-up resistors R11, R12, R13 which are respectively connected to power voltage $V_{cc}$, the series port sensing enable signal line—SIOSELN, and address selecting signal lines ASEL and ASEL2. Further, jumpers JP11, JP12, JP13 are each connected to ground GND, as well as being connected to the series port sensing enable signal line—SIOSELN, and address selecting signal lines ASEL1 and ASEL2, respectively. The inputs of input-output sensing programmable array logic means 10 (PAL) are connected to the series port sensing enable signal line—SIOSELN, address selecting signal lines ASEL1 and ASEL2, address signal lines SA0 to SA9, and address enable signal line AEN. Resistors R25–R28 are respectively connected to nodes of the full-up resistances R21–R24 and jumpers JP21–JP24, and to delay time signal lines /TSEL1–/TSEL4. Internal-operation sensing PAL 20 is connected to chip selecting signal line /SCRTYCS, data signal lines SD0–SD7, delay time signal lines /TSEL1–/TSEL4, and state signal lines /STATE1 and /STATE2. The input stages of controlling PAL 30 are connected to signal line KBDCS for sensing the use of the input-output mechanism of input-output sensing PAL 10, delay time signal lines /TSEL1–/TSEL4 of internal-operation sensing PAL 20, hardware disable signal line /DISHW, reset signal line RESET, and input-output reading signal line IORN. Finally, the input of counter 40 is connected to counter clear signal line /CLCNTN of controlling PAL 30, and its outputs are connected to counting value signal lines CSEL1–CSEL4 of controlling PAL 30.

The following description is related to the operation of the power-supply control system for the peripheral equipment of a computer in accordance with a first preferred embodiment of the present invention.

Data transmission between the input and output means and a central processing unit (CPU) is performed by mutually sending and receiving address signals, data signals and controlling signals through the system bus. Accordingly, by testing signals transmitted through the system bus it can be determined whether the input and output means are currently being used or not. Input-output sensing PAL 10 senses both address signals SA0–SA9 and address enable signal AEN of the system bus. Consequently, the use of the keyboard, the first series port or the second series port are detected.

When both the address signals SA0–SA9 which are transmitted through the system bus have values of 60H, 3F8H and 2F8H, and address enable signal AEN is at a low level, input-output sensing PAL 10 detects whether the input and output means are currently being used. It also outputs a high-level signal indicating the use of the input-output means (/RBDCS).

In this case, the values of the address signals, namely 60H, 3F8H and 2F8H, indicate the designation addresses for the keyboard, the first series port, and the second series port, respectively.

By turning jumper JP11 on or off, the user may selectively determine if the first and second series ports are tested. That is, if he turns on jumper JP11, input-output sensing PAL 10 uses low-level series port sensing enable signal SIOSELN to determine whether the series ports are used or not. However, it should be noted that if the user turns off jumper JP11, input-output sensing PAL 10 does not use high level series port sensing enable signal SIOSELN to sense whether the series ports are used or not.

In addition, input-output sensing PAL 10 outputs a signal across chip-selecting signal line /SCRTYCS in response to the state of jumpers JP12 and JP13, and of address signals SA0–SA9. That is, input-output sensing PAL 10 outputs high-level chip-selecting signal /SCRTYCS under four conditions. They are (1) when both address selecting signals ASEL1 and ASEL2 are at a high level, and address signals SA0–SA9 are equal to 100H, (2) when ASEL1 is at a low level, ASEL2 is at a high level, and address signals SA0–SA9 are equal to 110H, (3) when ASEL1 is at a high level, ASEL2 is at a low level, and address signals SA0–SA9 are equal to 120H, (4) or when address selecting signals ASEL1 and ASEL2 are both at a low level, and address signals SA0–SA9 are equal to 130H. An internal structural equation of input-output sensing PAL 10 is as follows.

```
CHIP U1 PAL16L8
SA9   SA8   SA7   \SA6   SA5   SA4   SA3   SA2   SA1   GND
SA0   SCRTYCS   KBDCS   NC   AEN   ASEL1   ASEL2   SIOSELN   NC
```

$V_{cc}$ Equations

/KBDCS := /AEN * /SA9 * /SA8 * /SA7 * SA6 * SA5 * SA4

*/SA3 * /SA2 * /SA1 * /SA0; 60H (Keyboard port)

+/SIOSELIN*/AEN * SA9 * SA8 * SA7 * SA6 * SA5 * SA4

*SA3 * /SA2 * /SA1 * /SA0; 3F8H (The first-series port)

+ /SIOSELN*/AEN * SA9 * SA8 * SA7 * SA6 * SA5 * SA4

* SA3 * /SA2 * /SA1 * /SA0; 2F8H (The second-series port)

/SCRTYCS := ASEL1 * ASEL2 * /AEN * /SA9 * SA8 * /SA7 * /SA6

*/SA5 * SA4 * /SA3 * /SA2 * /SA1 * /SA0; 100H

+/ASEL1* ASEL2 * /AEN * /SA9 * SA8 * /SA7 * /SA6

* /SA5 * SA4 * /SA3 * /SA2 * /SA1 * /SA0; 110H

+ASEL1* /ASEL2 * /AEN * /SA9 * SA8 * /SA7 * /SA6

* SA5 * /SA4 * /SA3 * /SA2 * /SA1 * /SA0; 120H

+/ASEL1*/ASEL2 * /AEN * /SA9 * SA8 * /SA7 * /SA6

* SA5 * SA4 * /SA3 * /SA2 * /SA1 * /SA0; 130H

Internal-operation sensing PAL 20 tests the internal state and operation, and determines whether it disables the hardware logic or not. Then, it outputs hardware disable signal /DISHW when high-level chip-selecting signal /SCRTYCS is input from input-output sensing PAL 10.

If high-level chip-selecting signal /SCRTYCS is input to internal-operation sensing PAL 20, state signals /STATE1 and /STATE2 attain a high level. Then, if data signals SD0–SD7 are equal to 91H, internal-operation sensing PAL 20 outputs high-level hardware disable signal /DISHW.

State signal /STATE1 attains a high level, when each of the prior state signals /STATE1 and /STATE2 are at a low level and data signals SD0–SD7 are equal to either 37H or 29H. State signal /STATE2 attains a high level, when prior state signal /STATE1 is at a high level, prior state signal /STATE2 is at a low level, and the data signals SD0–SD7 equal to 73H. State signal /STATE2 also attains a high level when both prior state signals /STATE1 and /STATE2 are at a low level, and the data signals SD0–SD7 are equal to 29H.

In addition, internal-operation sensing PAL 20 senses both the internal state and operation. It then outputs delay time signals /TSEL1–/TSEL4.

That is, internal-operation sensing PAL 20 outputs high-level delay time signal /TSEL1 provided one of four conditions exist. Those conditions are when /STATE1 is at a low level, /STATE2 is at a high level and data signal SD0 is 0H, or when high-level chip-selecting signal /SCRTYCS is input to internal-operation sensing PAL 20 from input-output sensing PAL 10, or when low-level chip-selecting signal /SCRTYCS is input to PAL 20 from input-output sensing PAL 10, or when /TSEL1 is at a high level while /STATE1 is at a high level or while /STATE2 is at a low level.

Internal-operation sensing PAL 20 outputs high-level delay time signal /TSEL2 provided one of four conditions exist. Those conditions are when STATE1 is at a low level, /STATE2 is at a high level, and data signal SD1 is equal to 0H, or when high-level chip-selecting signal /SCRTYCS is input to internal-operation sensing PAL 20 from input-output sensing PAL 10, or when low-level chip-selecting signal /SCRTYCS is input to PAL 20 from input-output sensing PAL 10, or when /TSEL2 is at a high level while either /STATE1 is at a high level or while STATE2 is at a low level.

Internal-operation sensing PAL 20 outputs high-level delay time signal /TSEL3 provided one of four conditions exist. Those conditions are when STATE1 is at a low level, /STATE2 is at a high level and data signal SD2 is 0H, or when high-level chip-selecting signal /SCRTYCS is input to internal-operation sensing PAL 20 from input-output sensing PAL 10, or when low-level chip-selecting signal /SCRTYCS is input to PAL 20 from input-output sensing PAL 10, or when /TSEL3 is at a high level while /STATE2 is at a high level or while /STATE2 is at a low level.

Internal-operation sensing PAL 20 outputs high-level delay time signal /TSEL4 provided one of four conditions exist. Those conditions are when STATE1 and /STATE2 are at a low level and data signal SD3 is 0H, or when high-level chip-selecting signal SCRTYCS is input to internal-operation sensing PAL 20 from input-output sensing PAL 10, or when low-level chip-selecting signal /SCRTYCS is input to PAL 20 from input-output sensing PAL 10, or when /TSEL4 is at a high level while /STATE2 is at a high level or while STATE2 is at a low level.

Note that a user determines the output of delay time signals /TSEL1–/TSEL4 by setting jumpers JP21–JP24 as either on or off, respectively.

An internal structural equation of input-output sensing PAL 20 is as follows.

```
CHIP U2 PAL16RG
CLK   SD7   SD6   SD5   SD4   SD3   SD2   SD1   SD0   GND
OE   DISHWN   TSEL1   TSEL2   TSEL3   TSEL4   STATE1   STATE2
SCRTYCS   VCC
    Equations
/DISHW : = /SCRTYCS * /STATE1 * /STATE2 * SD7 * /SD6 *
/SD5
*SD4 * /SD3 * /SD2 * SD1 * SD0
/STATE1: = /SCRTYCS * STATE1 * STATE2 * /SD7 * /SD6
*SD5
* SD4 * S D3 * SD2 * SD1 * SD0
+/SCRTYCS * STATE1 * STATE2 * /SD7 * /SD6 * SD5
* SD4 * SD3 * /SD2 * /SD1 * SD0
/STATE2: = /SCRTYCS * /STATE1* STATE2 * /SD7 * SD6 *
SD5
* SD4 * /SD3 * /SD2 * SD1 * SD0
+/SDRTYCS * STATE1 * STATE2 * /SD7 * /SD6 * SD5
* /SD4 * SD3 * /SD2 * /SD1 * SD0
/TSEL1 : =      /SCRTYCS * STATE1 * /STATE2 * 'SD0
                +SDCRTYCS * /TSEL1
                +/STATE1 * /TSEL1
                + STATE2 * /TSEL1
/TSEL3 :=     /SCRTYCS * STATE1 * /STATE2 * /SD2 +
              SCRTYCS * /TSEL3
              + /STATE1 * /TSEL3
              + STATE2 * /TSEL3
/TSEL4 :=     /SCRTYCS * STATE1 * /STATE2 * /SD3
              + SCRTYCS * /TSEL4
              + /STATE1 * /TSEL4
              + STATE2 * /TSEL4
```

Controlling PAL 30 outputs high-level counter clear signal /CLCNTN to counter 40 when both input-output reading signal of the system bus IORN is at a low level, and when high-level signal /KBDCS is input to controlling PAL 30 from input-output sensing PAL 10, where /KBDCS is used for sensing the use of input-output mechanism.

The continuously varying count value of counter is output to controlling PAL 30 via counting value signal lines CSEL1–CSEL4. When high-level counter clear signal /CLCNTN is input to counter 40 from controlling PAL 30, counter 40 resets to counting value zero. Once reset, it starts a new counting operation from zero.

Controlling PAL 30 compares counting value signals CSEL1–CSEL4, which are input from counter 40, with delay time signals /TSEL1–/TSEL4, which are input from internal-operation sensing PAL 20. It then generates a power-supply cut off signal /VOFF for the external input-output unit on the basis of this comparison. That is, controlling PAL 30 outputs high-level power-supply cut off signal /VOFF to the external input-output unit when one of four conditions exists. Either delay time signals /TSEL1–/TSEL4 are at a high level, or input-output reading signal IORN of the system bus is at a low level while the high-level signal for sensing the use of input/output means (/KBDCS) is input to controlling PAL 30 from the input-output sensing PAL 10, or when auxiliary signal /DUMMY is at a high level while prior power-supply cut off signal /VOFF is at a high level, or, finally, when the reset signal RESET is at a high level.

The auxiliary signal /DUMMY attains a high level when one of seven conditions exists. Either the delay time signal /TSEL4 is at a high level and counting value signal CSEL4 is at a high level, or delay time signal /TSEL4 is at a low level and counting value signal CSEL4 is at a low level, or delay time signal /TSEL3 is at a high level and counting value signal CSEL3 is at a high level, or delay time signal /TSEL3 is at a low level and counting value signal CSEL3 is at a low level, or delay time signal /TSEL2 is at a low level and counting value signal CSEL2 is at a low level, or delay time signal /TSEL1 is at a high level and counting value signal CSEL1 is at a high level, or delay time signal /TSEL1 is at a low level and counting value signal CSEL1 is at a low level.

Controlling PAL 30 outputs high-level software enable signal /ENSWN when either the hardware disable signal input from the internal-operation sensing PAL 20 (/DISHW) is at a low level and the system bus reset signal (RESET) is at a low level, or when the prior software enable signal (/ENSWN) is at a high level and the reset signal (RESET) is at a low level.

An internal structural equation of controlling PAL 30 is as follows.

```
CHIP U3 PAL16R4
    CLK   TSEL4   TSEL3   TSEL2   TSEL1   CSEL4   CSEL3   CSEL2
CSEL1   GND
    OE   IORN   RESET   CLCNTN   DUMMY   VOFF   ENSWN   DISHW
KBDCS   VCC
    Equations
/CLCNTN : /KBDCS * /IORN
/VOFF : = /TSEL4 * /TSEL3 * /TSEL2 * /TSEL1 + /KBDCS *
/IORN + /VOFF * /DUMMY + RESET
```

```
                  -continued
/DUMMY :=   /TSEL4 * CSEL4
            + TSEL4 * /CSEL4
            +/TSEL3 * CSEL3
            + TSEL3 * /CSEL4
            + /TSEL2 * CSEL2
            + TSEL2 * /CSEL2
            +/TSEL1 * CSEL1
            TSEL * /CSEL1
/ENSWN: =   /RESET * DISHW
            + /RESET * /ENSWN
```

The power-supply control system of the first preferred embodiment of this invention generates a signal for automatically cutting off the AC input power supplied to the peripheral equipment. Therefore, even if a user does not directly cut off the AC input power when he stops working, the AC input power to the peripheral equipment is cut off after no input has been entered for a predetermined period of time. Further, when the data is input to the computer system through an input means, the AC input power to the peripheral equipment is restored.

Figure 2:
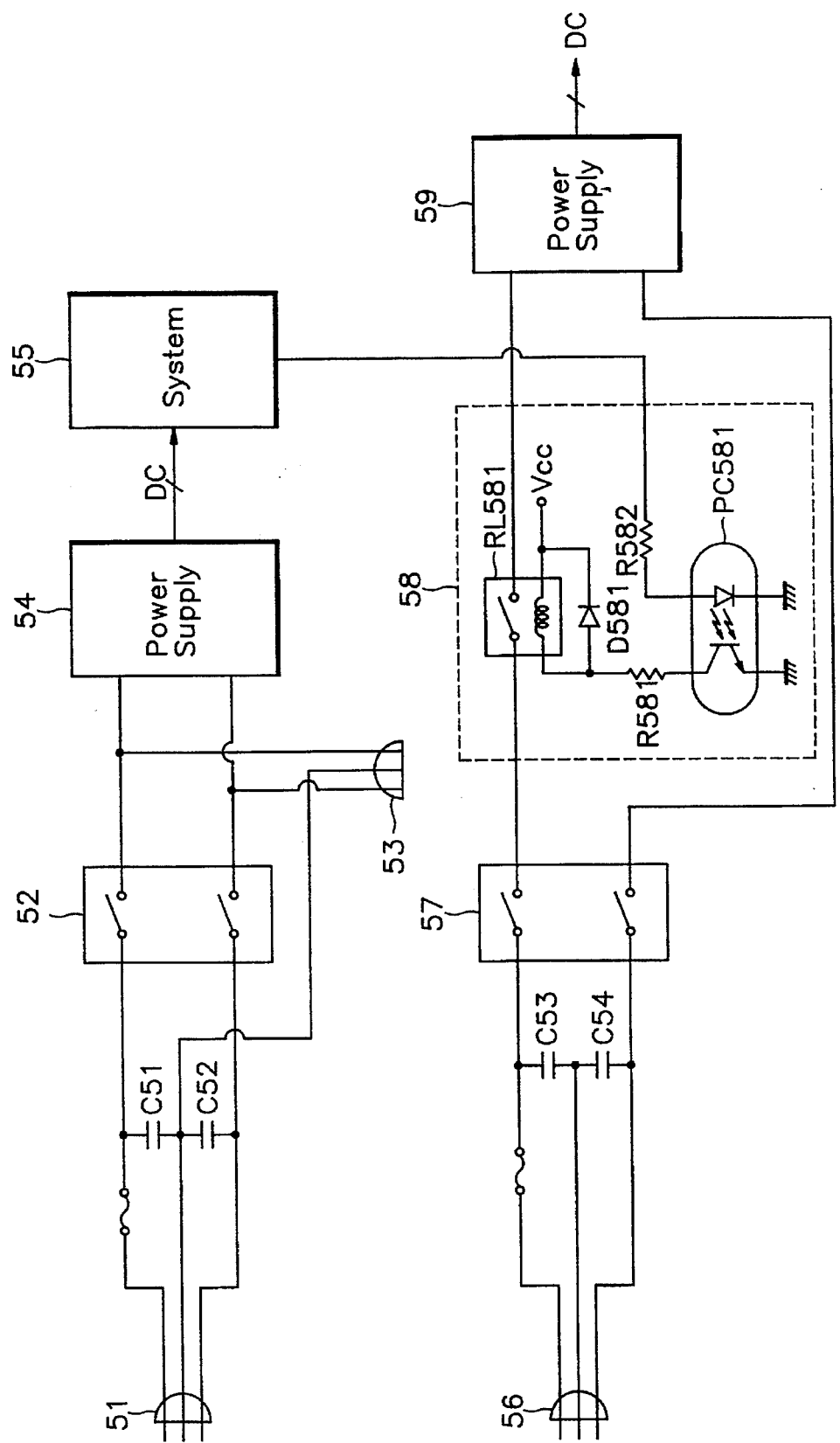
FIG. 2 is a detailed circuit diagram of a power-supply control system of the peripheral equipment of a computer in accordance with a second preferred embodiment of the present invention.

FIG. 2 is a detailed circuit diagram of a power-supply control system of the peripheral equipment of a computer in accordance with a second preferred embodiment of the present invention.

As shown in FIG. 2, the power-supply control system of the peripheral equipment of a computer includes system power switch 52 connected to a system power plug, system socket 53 connected to system power switch 52, system power supply 54 having an input terminal connected to system power switch 52, system 55 having an input terminal connected to output means of system power supply 54, a power switch for peripheral equipment 57 connected to the power plug for peripheral equipment 56, power controller for peripheral equipment 58 having an input terminal connected to output means of the power controller for peripheral equipment 58, and power supply 59 for peripheral equipment having an input terminal connected to an output terminal of power controller for peripheral equipment 58.

Power controller for peripheral equipment 58 includes relay RL581 having a switch input terminal connected to the output terminal of power switch for peripheral equipment, 57. This power controller also has a coil input terminal connected to power $V_{cc}$, diode D581 having an anode connected to a coil output terminal of relay RL581 and having a cathode connected to the power $V_{cc}$, resistance R581 having one terminal connected to the coil output terminal of relay RL581, resistance R582 having one terminal connected to the output terminal of system 55, photo-coupler PC581 having a collector of a photo-receiving transistor connected to the other terminal of resistance R581, and an anode of a light-emitting diode connected to the other terminal of resistance R582 and having its other terminal grounded.

The following describes the operation of the power-supply control system for the peripheral equipment of a computer in accordance with a second preferred embodiment of the present invention.

If the AC power is input from system power plug 51, the AC power is applied to system power switch 52 via capacitors C51 and C52. If a user turns on system power switch 52, the AC power that passes through system power switch 52 is applied to system socket 53 and system power supply 54. Direct current power (DC), rectified and smoothed by system power supply 54, is applied to system 55 to operate that system.

If a user turns off system power 52, the AC power supplied to system socket 53 and system power supply 54 via system power switch 52 is cut off.

It is possible to use power plug for peripheral equipment 56 by connecting it either to system socket 53 or to a separate socket (not illustrated). When the power plug is connected to system socket 53 and the user turns on power switch for peripheral equipment 57 after he turns on system power switch 53, the AC power is applied to power controller 58 via the power plug for peripheral equipment, 56. When power plug for peripheral equipment 56 is connected to the separate socket and the user turns on power switch for peripheral equipment 57, the AC power is applied to power controller for peripheral equipment 58 via the power plug for peripheral equipment, 56.

Accordingly, the AC power is continuously applied to power controller for peripheral equipment 58 via the power plug for peripheral equipment when the user stops working on the computer and forgets to turn off either system power switch 52 or the power switch for peripheral equipment, 57.

In the case where data is not input to system 55 for a long time, system 55 outputs a high-level signal to the power controller for peripheral equipment, 58.

If the high-level signal from system 55 is received by photo-coupler PC581 of power controller 58, the light-emitting diode in photo-coupler PC581 is turned on to emit light. If the light emitted from the light emitting diode in the photo-coupler is input to a base of the photo-receiving transistor, the photo-receiving transistor is turned on. Then, an electric current is sent to a coil of relay RL581. In this case, a signal is transmitted by photocoupler PC581, and the electrical noise signal contained in the signal input from system 55 is considerably reduced.

When the electrical current is sent to the coil of relay RL581 of power controller 58, a magnetic field is generated from the coil, and the switch in relay RL581 is turned off.

If the data is input to system 55 because the user is again working on the computer, a low-level signal is input from system 55 to power controller 58 via the data signal line connected between system 55 and the peripheral equipment.

If the low-level signal is input from system 55 to power controller 58, the light emitting diode in photo-coupler PC581 is turned off. Accordingly, the photo-receiving transistor is also turned off.

If the photo-receiving transistor of photocoupler PC581 is turned off, the electric current sent to the coil of relay RL581 is also cut off, and the switch in relay RL581 is again turned on. The AC power is then supplied to power supply for peripheral equipment 59 via the power switch for peripheral equipment, 57.

The second preferred embodiment of this invention is similar to the first embodiment because it provides a power-supply control system for the peripheral equipment of a computer that generates a signal for automatically cutting off AC input power applied to the peripheral equipment. Therefore, even if a user does not directly cut off the AC input power when he stops working, the AC input power to the peripheral equipment is cut off after a predetermined period of time elapses without input being entered. Further, when the data is input to the computer system through an input means, the AC input power to the peripheral equipment is restored.

Figure 3:
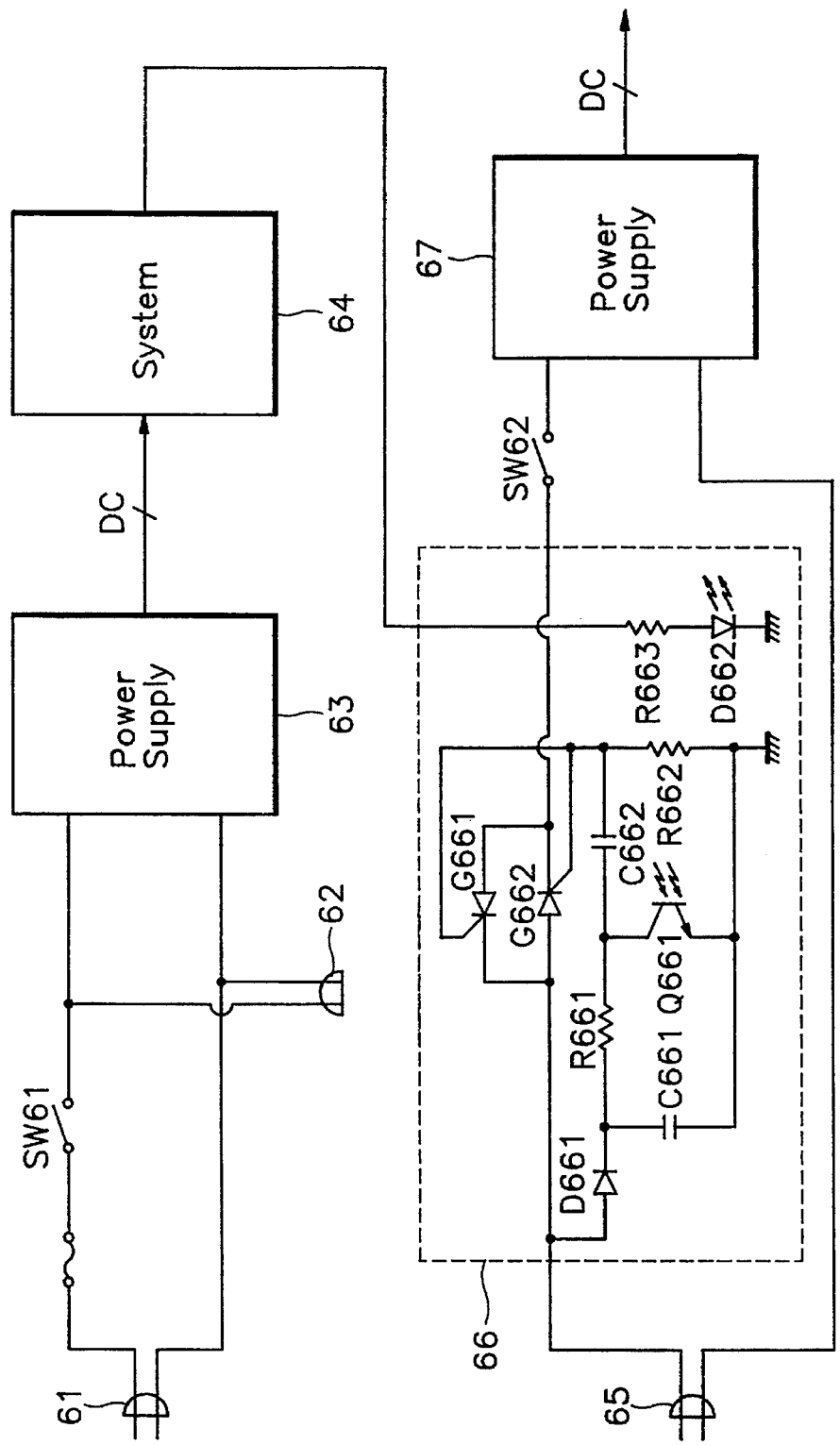
FIG. 3 is a detailed circuit diagram of a power-supply control system of the peripheral equipment of a computer in accordance with a third preferred embodiment of the present invention.

FIG. 3 depicts a detailed circuit diagram of a power-supply control system of the peripheral equipment of a computer in accordance with a third preferred embodiment of the present invention.

As shown in FIG. 3, the power-supply control system of the peripheral equipment of a computer comprises system power plug 61, system power switch SW61 which is serially connected to system power plug 61, system power socket 62 which is connected to the system power switch SW61 and system power plug 61, system power supply 63 having an input terminal connected to system power switch SW61 and system power plug 61, system 64 having an input terminal connected to an output terminal DC of system power supply 63, power plug for peripheral equipment 65, power cut-off means for peripheral equipment 66 having an input terminal connected to power plug for peripheral equipment 65 and output terminal of system 64, power switch for peripheral equipment SW62 connected to an output terminal of power cut-off means for peripheral equipment 66, and power supply for peripheral equipment 67 having an input terminal connected to both power switch SW62 and power plug 65.

Power cut-off means 66 for peripheral equipment includes gate turn-off thyristors (GTOs) G661 and G662 which are connected to each other and are inversely parallel between power plug 65 for peripheral equipment and power switch SW62 for peripheral equipment. Diode D661 has an anode connected to both power plug 65 and nodes of GTOs G661 and G662. A capacitor is connected between a cathode of diode D661 and ground, and resistor R661 has one terminal connected to the cathode of diode D661. Photo-receiving transistor Q661 has a collector terminal connected to the other terminal of resistance R661 and has a grounded emitter. Capacitor C662 has one terminal connected to the collector of photo-receiving transistor Q661 and the other terminal connected to the gate terminals of GTOs G661 and G662. Resistor R662 is connected to the other terminal of capacitor C662 and to ground, and resistance R663 has one terminal connected to the output terminal of the system. Light-emitting diode D662 has an anode connected to the other terminal of resistor R663 and a grounded cathode.

Now, the following description is about the operation of a power-controlling system for peripheral equipment of a computer in accordance with the third preferred embodiment.

If the AC power is input from the system power source plug 61, the AC power is applied to the system power source switch SW61. In this occasion, if the user turns on the system power switch SW61, the AC power that passed through the system power switch SW61 is applied to the system power socket 62 and the system power supply 63, and a direct current power rectified and smoothed by the system power supply 63 is applied to the system 64 by the system to operate it.

If the user turns off system power switch SW61, the AC power supplied to system power socket 62 and system power supply 63 is cut off.

Power plug 65 for peripheral equipment may be connected to system power socket 62 and a separate power socket (not illustrated). When power plug 65 is connected to system power source socket G2 and the user turns on system power switch SW61, AC power is supplied to power cut-off means 66 via power plug 65.

When power plug 65 for peripheral equipment is connected to the separate power socket, the AC power is directly supplied to power cut-off means 66 for peripheral equipment via power plug 65.

The AC power input to power cut-off means for peripheral equipment 66 via power plug for peripheral equipment 65 is rectified and smoothed by diode D661 and capacitor C661. It is also converted into a direct voltage to be supplied to capacitor C662. Accordingly, the pulse signal is applied from capacitor C662 to the gate terminal of GTOs G661 and G662 at the initial stage, and both G661 and G662 are thereby turned on. When GTOs G661 and G662 are turned on, the AC power input for peripheral equipment passes through them via power plug 50. The AC power input is then output to the power switch for the peripheral equipment, SW62. When this occurs, photo-receiving transistor Q661 is turned off.

GTOs G661 and G662, as mentioned above are different from a general thyristor. Specifically, the GTOs are turned on or turned off by a gate signal, without regard to an input signal.

The AC power generated from power cut-off means for peripheral equipment 66 is applied to power supply for peripheral equipment 67 via power switch for peripheral equipment SW62. It is then rectified and smoothed. Thus, the AC power is converted into a DC power, and then applied to the peripheral equipment (not illustrated) to operate the peripheral equipment.

When a user who has been working on a computer stops working on the computer, if he forgets to turn off either system power switch SW61 or power switch SW62 for peripheral equipment, the AC power input via power plug 65 for peripheral equipment is continuously applied to the peripheral equipment resulting in a waste of electric power.

Sometimes a long lapse in time exists before the data signal is input to system 64 via the data signal line which is connected to between system 64 and the peripheral equipment. In this case, a high-level signal is applied to power cut-off means 66 for peripheral equipment from an output port (a serial or parallel port) of system 64.

The signal applied to power cut-off means for peripheral equipment 66 is applied to light-emitting diode D662 via resistance R663.

As light-emitting diode D662 of power cut-off means 66 operates, a light-signal emitted from the light-emitting diode D662 is input to a base of photo-receiving transistor Q661. The photo-receiving transistor is thereby turned on, and capacitor C662 begins to discharge electricity.

If capacitor C662 of power cut-off means 66 for peripheral equipment discharges electricity, the voltages at the gate terminals for GTOs G661 and G662 have a negative (−) values, and GTOs G661 and G662 are thereby turned off. If GTOs G661 and G662 are turned off, the supply of the AC power input, via power plug for peripheral equipment 65, is cut off to prevent a waste of electric power by the unused peripheral equipment.

When the user again begins working on the computer, he inputs data to system 64. Then a low-level signal is applied to power cut-off means for peripheral equipment 66 from system 64. It is then applied to light-emitting diode D662 via the resistance R663 to stop the operation of light-emitting diode D662.

If light-emitting diode D662 of power cut-off means 66 for the peripheral equipment stops operating, photo-receiving transistor Q661 will remain turned off. A voltage signal rectified and smoothed by diode D661 and capacitor C661 is thus supplied to capacitor C662 via resistance R661. An instantaneously pulsed signal is then generated from capacitor C662 and output to the gate terminal of GTOs G661 and G662.

The AC power input via the power plug for peripheral equipment 65 is applied to the power supply for peripheral equipment 67 via GTOs G661 and G662. The power switch for peripheral equipment SW62, in accordance with GTOs G661 and G662 of the power cut-off means for peripheral equipment 66 is again turned on. Accordingly, the peripheral equipment may operate normally.

The third preferred embodiment of this invention provides the power-supply control system of the peripheral equipment of a computer having the advantages that no noise is generated and mechanical abrasion occurs because the AC power is by applied and cut off through the GTOs without any mechanical contact.

These advantages may also be applied to the power management system for peripheral equipment of a computer.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A power-supply control system for a peripheral equipment of a computer comprising:
   first switching means for generating a serial port sensing signal and an address selecting signal which is user adjustable;
   input-output sensing means for both determining which input and output means are being used by testing a serial port sensing enable signal, an address selecting signal, an address signal and an address enable signal, and for outputting a signal which senses the use of an input-output means;
   internal-operation sensing means for both generating a delay-time signal and a hardware disable signal, and for sensing the internal state and operation of a computer from a chip selecting signal of the input-output sensing means, a data signal, said delay-time signal and a state signal;
   second switching means for enabling an adjustment of said delay-time signal by the user;
   a counter for outputting a current counting value, for performing a continuous counting operation, and for resetting in response to a counter clear signal; and
   controlling means for outputting a power controlling signal to an external input-output means based on the use of the input-output means of said input-output sensing means, the delay-time signal of said internal-operating sensing means, the hardware disable signal, a reset signal of a system bus, a signal for reading the input and output means, and the counting value of said counter.

2. A power-supply control system of a peripheral equipment of a computer comprising:
   a system for sensing when a user does not input data to a computer through input means, for sensing when a user resumes working on the computer, and for outputting a power controlling signal via a data signal line; and
   a power controller for the peripheral equipment which is connected to said system and said data signal line for controlling an AC power supplied to the peripheral equipment, where the AC power supplied is cut off in response to the power controlling signal input from said system.

3. A power-supply control system for a peripheral equipment of a computer system comprising:
   a system for sensing when a user does not input data to a computer through input means, for sensing when a user resumes working on the computer, and for outputting a power controlling signal via a data signal line;
   a power controller for the peripheral equipment which is connected to said system and said data signal line for controlling an AC power supplied to the peripheral equipment, where the AC power supplied is cut off in response to the power controlling signal input from said system;
   wherein said power controller for said peripheral equipment includes a photo-coupler for operating when the power controlling signal is input from said system, and for transmitting the power controlling signal after said power controlling signal is converted into a photo-signal and converted into an electrical signal again; and
   a plurality of relays for applying an AC power to a power supply when said photo-coupler operated, and for cutting off the supply of the AC power when said photo-coupler does not operate.

4. A power-supply control system of a peripheral equipment of a computer comprising:
   a system for sensing when a user does not input data to a computer through input means, for sensing when a user resumes working on the computer, and for outputting a power controlling signal via a data signal line; and
   power cut-off means for peripheral equipment which eliminates noise and mechanical abrasion by applying or cutting off an AC power supplied to the peripheral equipment using gate turn-off thyristors which operate in response to the power controlling signal input from said system.

5. A power-supply control system for a peripheral equipment of a computer system comprising:
   a system for sensing when a user does not input data to a computer through input means, for sensing when a user resumes working on the computer, and for outputting a power controlling signal via a data signal line; and
   power cut-off means for peripheral equipment which eliminates noise and mechanical abrasion by applying or cutting off an AC power supplied to the peripheral equipment using gate turn-off thyristors which operate in response to the power controlling signal input from said system, wherein said power cut-off means for peripheral equipment includes:
   a photo-coupler responsive to the power controlling signal from said system which transmits said power controlling signal after it is converted from a photo-signal to an electric signal;
   gate turn-off thyristors which are connected to each other in parallel with reversed polarity and are positioned between a power plug for peripheral equipment and a power supply for peripheral equipment;

a diode and a capacitor for rectifying and smoothing an AC power input from said power plug for said peripheral equipment; and a capacitor for turning on said gate turn-off thyristors when a direct signal is applied by said diode and capacitor, and for turning off said gate turn-off thyristors when said photo-coupler is turned on by said system.

* * * * *